United States Patent [19]
Kabasawa

[11] Patent Number: 5,696,650
[45] Date of Patent: Dec. 9, 1997

[54] DISK APPARATUS FOR APPLYING A CONTROLLABLE FORCE TO A SLICING MEMBER

[75] Inventor: Hidetoshi Kabasawa, Saitama-ken, Japan

[73] Assignee: Teak Corporation, Tokyo, Japan

[21] Appl. No.: 579,251

[22] Filed: Dec. 27, 1995

[30] Foreign Application Priority Data

Dec. 28, 1994 [JP] Japan .................................. 6-328946

[51] Int. Cl.$^6$ .................................................. G11B 17/02
[52] U.S. Cl. ............................................................ 360/99.06
[58] Field of Search ............................ 360/99.02, 99.06; 369/75.2, 77.2

[56] References Cited

U.S. PATENT DOCUMENTS

| 4,604,666 | 8/1986 | Kitahara et al. ............... 360/99 |
| 5,537,271 | 7/1996 | Kumai et al. ............. 360/99.06 |

FOREIGN PATENT DOCUMENTS

| 56-41564 | 4/1981 | Japan . |
| 56-54668 | 5/1981 | Japan . |
| 56-90471 | 7/1981 | Japan . |
| 60-80184 | 5/1985 | Japan . |
| 1-58586 | 12/1989 | Japan . |

Primary Examiner—Robert S. Tupper
Attorney, Agent, or Firm—Michael N. Meller

[57] ABSTRACT

A sliding member slides in response to a disk cartridge being inserted into a holder. The holder moves, as a result of the sliding of the sliding member, from a disk cartridge insertion/ejection position at which the disk cartridge is inserted into the holder to a disk cartridge loading position at which the disk cartridge is loaded. A rotation member is rotatably provided within a sliding range of the sliding member. A force applying member is also provided within the sliding range of the sliding member, one end of the force applying member is held by the sliding member and the other end of the force applying member is held by the rotation member. The force applying member applies a force to the sliding member in a direction opposite to a direction along which the sliding member is sliding at the beginning of movement of the holder from the disk cartridge insertion/ejection position to the loading position. The force applying member applies a force to the sliding member along the direction along which the sliding member is sliding after the rotation member rotates a predetermined angle in a process in which the sliding member is sliding.

5 Claims, 13 Drawing Sheets

DISK APPARATUS FOR APPLYING A CONTROLLABLE FORCE TO A SLICING MEMBER

BACKGROUND OF THE INVENTION

1. Field of the Invention

The present invention relates to a disk apparatus, in particular, to a disk apparatus in which a holder is moved from a cartridge insertion/ejection position to a loading position through a sliding operation of a sliding member which slides upon insertion of the disc cartridge into the holder.

2. Description of the Related Art

A magnetic disk apparatus has a disk cartridge loaded therein, the disk cartridge has a flexible magnetic disk contained therein. The disk apparatus then performs magnetic data recording and reproducing on the disk. Such a disk apparatus has a holder in which the disk cartridge is inserted, and a slider as a sliding member which slides upon insertion of the disk cartridge into the holder and thus moves the holder from a cartridge insertion/ejection position to a loading position.

A coil spring or the like applies a force to the slider along one direction. When the disk cartridge is inserted into the holder, a latch lever is pressed by an end of the disk cartridge and is rotated so as to free the slider from engagement with the latch lever. As a result, the slider slides along the force applying direction and thus moves the holder to the loading position. At this time, the holder is lowered from the cartridge insertion/ejection position into the loading position, and the disk in the disk cartridge is chucked on a turntable.

In order to ensure the above-described holder loading operation, the coil spring or the like applies a large force to the slider. The slider is accelerated by this force along the force applying direction and then has a constant velocity while the holder is moving from the cartridge insertion/ejection position to the loading position. By this operation, when the slider reaches a position at which the sliding operation is finished, a magnetic head may hit the disk with such a shock that a surface of the disk may be damaged by the magnetic head.

In order to prevent such a problematic situation from occurring, in the disk apparatus in the related art, a damper is provided for decelerating the slider. An example of such damper is an oil damper which comprises a gear engaged with a rack formed on the slider, a rotation member being rotated with the gear and a container which has a grease filled therein and the rotation member contained therein. In this oil damper, when the rotation member is rotated in the grease in the container due to a sliding operation of the slider, a deceleration force is generated due to a viscous resistance of the grease. As a result, the slider is decelerated.

However, in the disk apparatus in the related art described above, in order to enable a sufficient amount of the deceleration force to be generated due to the viscous resistance of the grease, it is necessary to have a large diameter rotation member which is contained in the container of the oil damper. Therefore, a large space is required in the disk apparatus for providing the oil damper. Also, the oil damper should be located in a position such that the oil damper does not prevent a smooth loading operation of the holder. As a result, the space for the oil damper is provided at a back side of the holder in the disk apparatus in the related art.

The foregoing requirements for a disk apparatus in the related art make it is difficult to miniaturize the disk apparatus. Further, such an oil damper not only requires a large mounting space but also increase manufacturing cost.

Further, because viscosity of the grease depends on a temperature thereof, the viscous resistance of the grease is so strong that the disk may not be positively loaded in the apparatus when the temperature is low and, the viscous resistance of the grease is so weak when the temperature is high that the magnetic head may damage the disk due to a high-speed loading operation.

SUMMARY OF THE INVENTION

An object of the present invention is to provide a disk apparatus, by which the above-described problem can be solved.

A disk apparatus according to the present invention comprises:

a sliding member which slides in response to a disk cartridge being inserted into a holder;

the holder, which moves as a result of sliding of the sliding member, from a disk cartridge insertion/ejection position to a disk cartridge loading position;

a rotation member rotatably provided within a sliding range of the sliding member;

a force applying member is also provided within the sliding range of the sliding member, one end of the force applying member is held by the sliding member and the other end of the force applying member is held by the rotation member;

the force applying member applies a force to the sliding member along a direction opposite to a direction along which the sliding member is sliding at the beginning of movement of the holder from the disk cartridge insertion/ejection position to the loading position; and the force applying member applies a force to the sliding member along the direction along which the sliding member is sliding after the rotation member rotates a predetermined angle in a process in which the sliding member is sliding.

Other objects and further features of the present invention will become more apparent from the following detailed description when read in conjunction with the accompanying drawings.

DESCRIPTION OF PREFERRED EMBODIMENT

Figure 1:
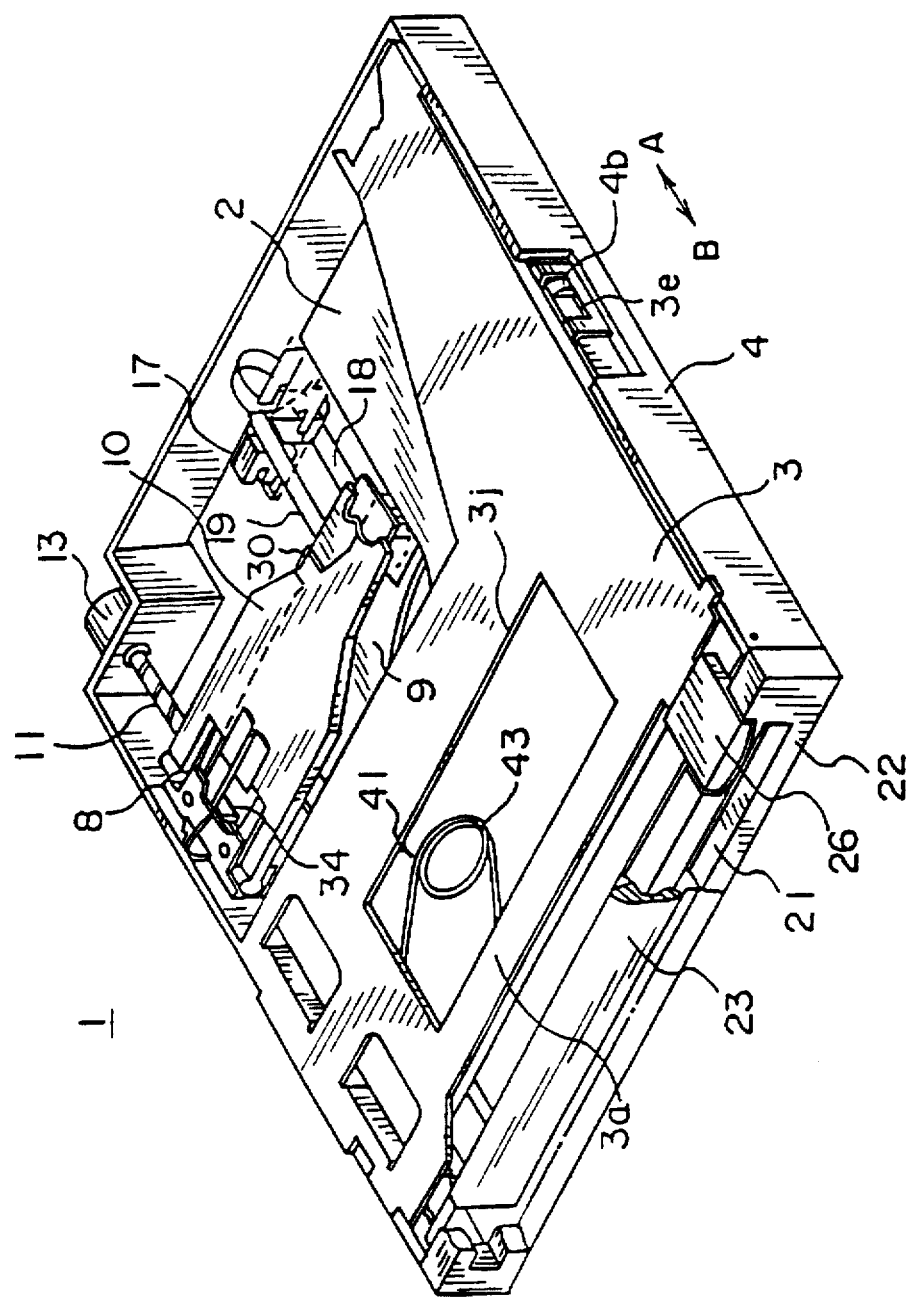
FIG. 1 shows a perspective view of a disk apparatus in one embodiment of the present invention.
Figure 2:
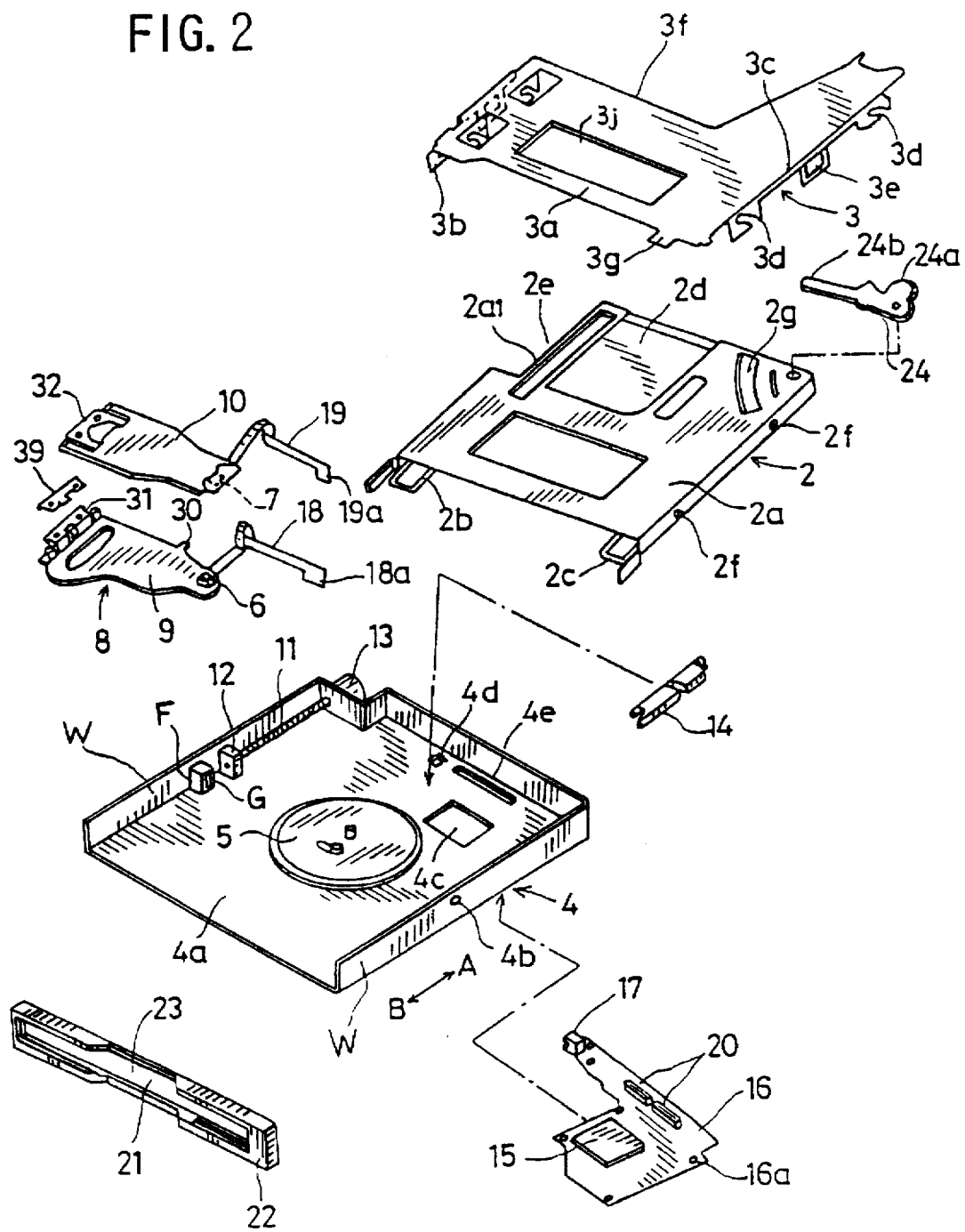
FIG. 2 shows an exploded perspective view of the disk apparatus shown in FIG. 1.
Figure 3:
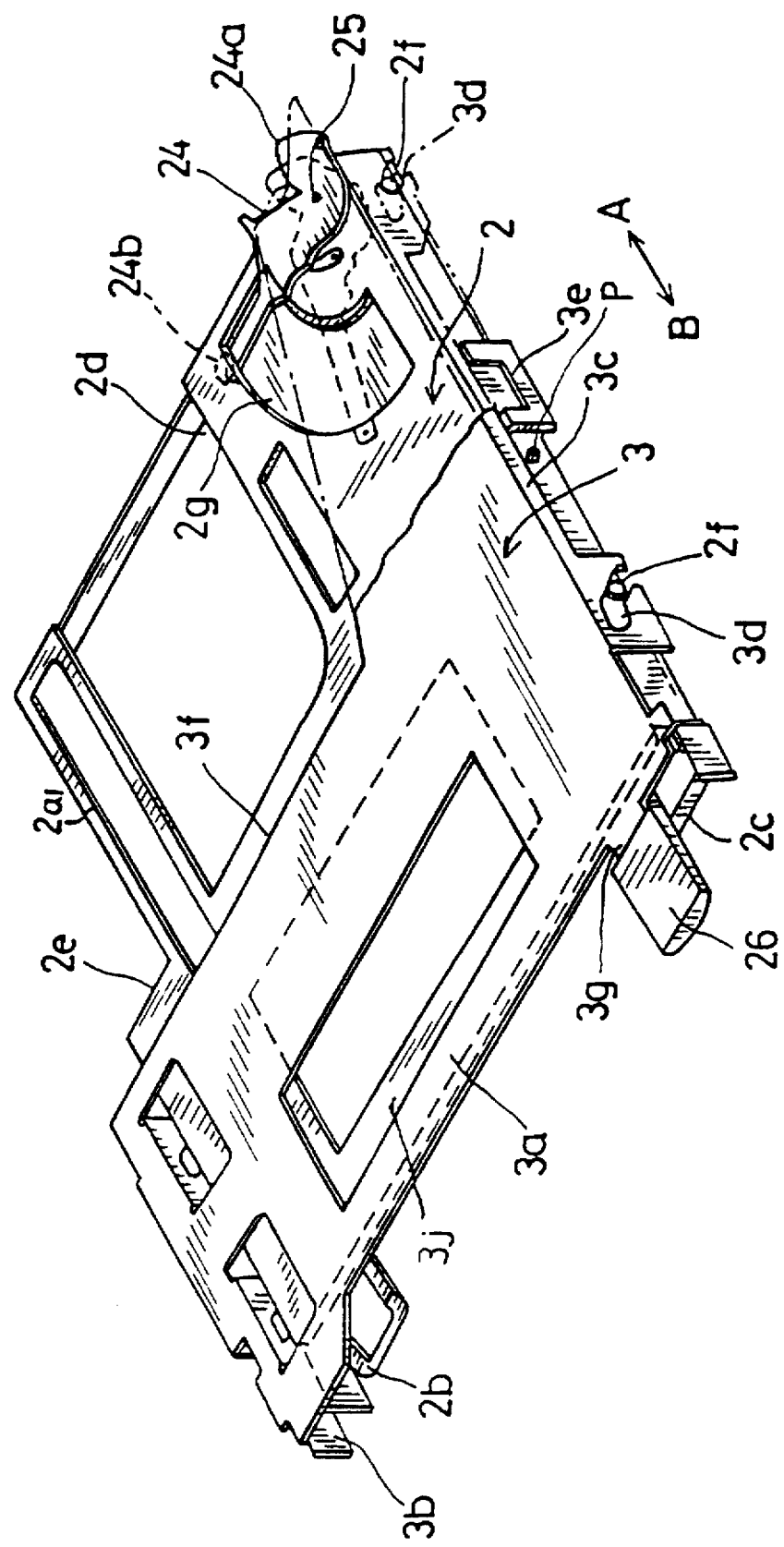
FIG. 3 shows a perspective view illustrating an arrangement, in the disk apparatus shown in FIG. 1, in which a holder and a slider are mounted.

With reference to the figures, the disk apparatus in the embodiment of the present invention will now be described. FIG. 1 shows a perspective view of the disk apparatus 1, FIG. 2 generally shows the exploded perspective view of the disk apparatus 1, and FIG. 3 shows the arrangement in which the holder 2 and the slider 3 are combined with one another.

The disk apparatus 1 has an arrangement in which the holder 2, into which the disk cartridge (not shown in the figures) is inserted, and the slider 3 which slides forward and backward and lifts and lowers the holder 2 are mounted onto a chassis 4. Further, provided on a plane plate 4a of the chassis, shown in FIG. 2, is a turntable 5 which is driven by a disk driving motor and a head carriage 8 which supports magnetic heads 6 and 7 therewith.

The head carriage 8 has the carriage body 9 which supports the magnetic head 6 on a top surface of a projecting end thereof and a head arm 10 which supports the magnetic head 7 on a bottom surface of a projecting end thereof and rotatably mounted on the carriage body 9. The head carriage 8 is mounted on the chassis 4 so that the head carriage 8 can slide forward (along a direction A shown in FIG. 1) and backward (along a direction B shown in FIG. 1).

Further, the head carriage 8 is engaged with a lead screw 11 which extends along the above-mentioned forward and backward directions. An end of the lead screw 11 is rotatably supported by a bearing 12 on the chassis 4 and the other end of the lead screw is connected with a driving shaft of a stepper motor 13 which is mounted at a rear side of the chassis 4 as shown in FIG. 1.

When the lead screw 11 is rotated a predetermined rotation angle by the stepper motor 13, the head carriage 8 is driven and thus moved along one of the directions A and B a distance corresponding to the rotation angle. Thus, the magnetic heads 6 and 7 are located at a desired track of the magnetic disk contained in the disk cartridge which is loaded in the disk apparatus 1. Through the magnetic heads 6 and 7, data is magnetically recorded to and reproduced from the magnetic head.

Further, on the plate 4a of the chassis 4, at a rear side of the turntable 5, a protector 14 is provided. When the disk cartridge is inserted in the holder 2, the protector 14 prevents the disk cartridge from colliding with the lower magnetic head 6 provided at the projecting end of the carriage body 9.

On the bottom surface the plate 4a of the chassis 4, as shown in FIG. 2, a circuit substrate 16 having a control circuit 15 is mounted thereon. On the circuit substrate 16, other than the control circuit 15 which controls an operation of the disk apparatus 1, a track position detecting sensor 17 and a connector 20 are provided. The track position detecting sensor 17 detects that the magnetic heads 6 and 7 are located at and slide on the outmost track "00" of the magnetic disk. Connecting parts 18a and 19a mounted at extending ends of flexible wiring plates 18 and 19 which are connected with the magnetic heads 6 and 7, respectively, are inserted into and connected with the connector 20.

Through holes 4c through 4e are formed in the plate 4a of the chassis 4, as shown in FIG. 2, in which the control circuit 15, track position detecting sensor 17 and connector 20 arranged on the substrate 16 are inserted. For this purpose, the shape of each of the through holes 4c through 4e corresponds to the shape of a respective one of these components. The substrate 16 is fixed to the bottom surface of the chassis by screws inserted from the bottom side through mounting holes 16a. After the substrate 16 has been mounted on the chassis 4, the control circuit 15 is inserted in the through hole 4c, the track position detecting sensor 17 and connector 20 are inserted in the through holes 4d and 4e respectively. Thus, the components project upwardly from the plate 4a of the chassis 4.

At a front end portion of the chassis 4, a front bezel 22 is provided which has a disk insertion slot 21, as shown in FIG. 2. On a rear surface of the front bezel 22, a flap 23 which closes the disk insertion slot 21 is mounted so that the flap 23 can be rotated along closing and opening directions.

The holder 2 and slider 3 will now be specifically described.

As shown in FIG. 2, the holder 2 is formed from a top plate 2a, cartridge guiding portions 2b and 2c which are bent so as to hold the disk cartridge from two opposite sides. Thus, a cartridge inserting space is formed surrounded by the top plate 2a and the cartridge guiding portions 2b and 2c.

On the top plate 2a of the holder 2, a contacting portion $2a_1$ which comes into contact with a bottom surface $10a_1$ of the head arm 10 is formed so as to extend in the directions A and B. This contacting portion $2a_1$ has a triangular cross section, a vertex of the triangle contacting the bottom surface $10a_1$ of the head arm 10, when a disk cartridge ejecting operation is performed, and rotates the head arm 10 upward.

Further, in order to allow a movement of the head carriage 8, an opening 2d is provided in the top plate 2a of the holder 2 and an opening 2e is provided at a left side of the plate 2a as shown in FIG. 2. Further, on a side plate of each of the cartridge guiding portions 2b and 2c, engaging pins 2f project as shown in FIG. 2 and engage with the slider 3.

Further, on the side plate of each of the cartridge guiding portions 2b and 2c of the holder 2, another engaging pin P projects outward as shown in FIG. 3. Further, on an inner surface of an each of two side walls of the chassis 4, a block F is provided and has a vertical groove G formed on the inner surface of the block F as shown in FIG. 2. When the holder 2 is set in the chassis 4, each of the two engaging pins P of the holder 2 is received by a respective one of the two vertical grooves G of the chassis 4. The engaging pins P are guided by the vertical grooves G, respectively as the holder 2 is rising and descending with respect to the chassis 4. Thus, movement of the rising and descending of the holder 2 is defined.

At a rear portion of the top plate $2a$ of the holder 2, a latch lever 24 is rotatably supported via a shaft 25. The latch lever 24 has a force applied thereto counterclockwise by a spring member not shown in the figures, and, before the disk cartridge is inserted therein, the latch lever 24 is rotated and positioned as indicated by a broken line in FIG. 3. After the disk cartridge has been inserted in the holder 2, the latch lever 24 is rotated and positioned as indicated by a solid line in FIG. 3.

The latch lever 24 has a holding cam $24a$ and a shutter opening/closing portion $24b$ shown in FIG. 2. The holding cam $24a$ prevent the slider 3 from moving. The shutter opening/closing portion $24b$ passes through an arc-shape hole $2g$ formed in the top plate $2a$ and extends into the holder 2. The shutter opening/closing portion $24b$ presses a shutter (not shown in the figures) of the disk cartridge so as to open the shutter as the disk cartridge is being inserted. The disk cartridge has openings thereon through which the heads 6 and 7 come into contact with and slide on the magnetic disk contained in the disk cartridge. These openings are normally closed with the above-discussed shutter.

The slider 3 is slidably mounted on the holder 2. The slider 3 has a top plate $3a$ facing the top plate $2a$ of the holder 2, side plates $3b$, $3c$ which are bent at the two sides of the top plate $3a$, inclined grooves $3d$ which are formed in the side plates $3b$, $3c$ and fitted with the above-mentioned engaging pins $2f$ of the holder 2 respectively, and engaging holes $3e$ which engage with projections $4b$ which project from two sides of the chassis 4 respectively. In the top plate $3a$ of the slider $3a$, an opening $3f$ is formed in a position facing the openings $2d$, $2e$ of the holder 2 so that the head carriage provided at the left side can move therein.

The slider 3 has a projecting piece $3g$ projecting forwardly at a front right portion thereof. Onto this projecting piece $3g$, an ejection button 26 is fixed. At a rear portion of the top plate $3a$, a holding portion $3h$ is downwardly bent and with which the above-mentioned holding cam $24a$ of the latch lever 24 is engaged and held.

Figure 4:
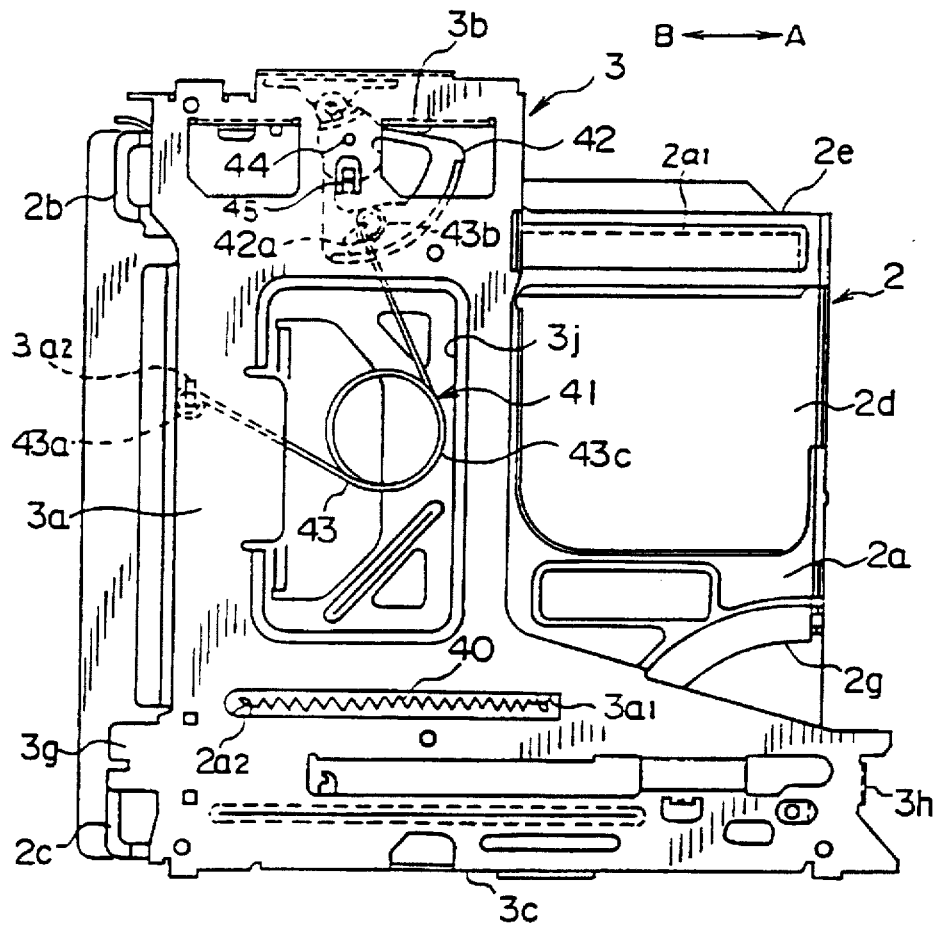
FIG. 4 shows a plan view illustrating an arrangement, in the disk apparatus shown in FIG. 1, in which the holder and slider are located in a disc cartridge insertion/ejection state.
Figure 5:
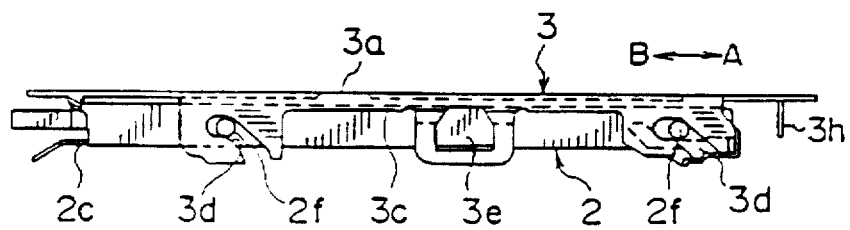
FIG. 5 shows a side elevation view illustrating the arrangement, in the disk apparatus shown in FIG. 1, in which the holder and slider are located in the disc cartridge insertion/ejection state.
Figure 6:
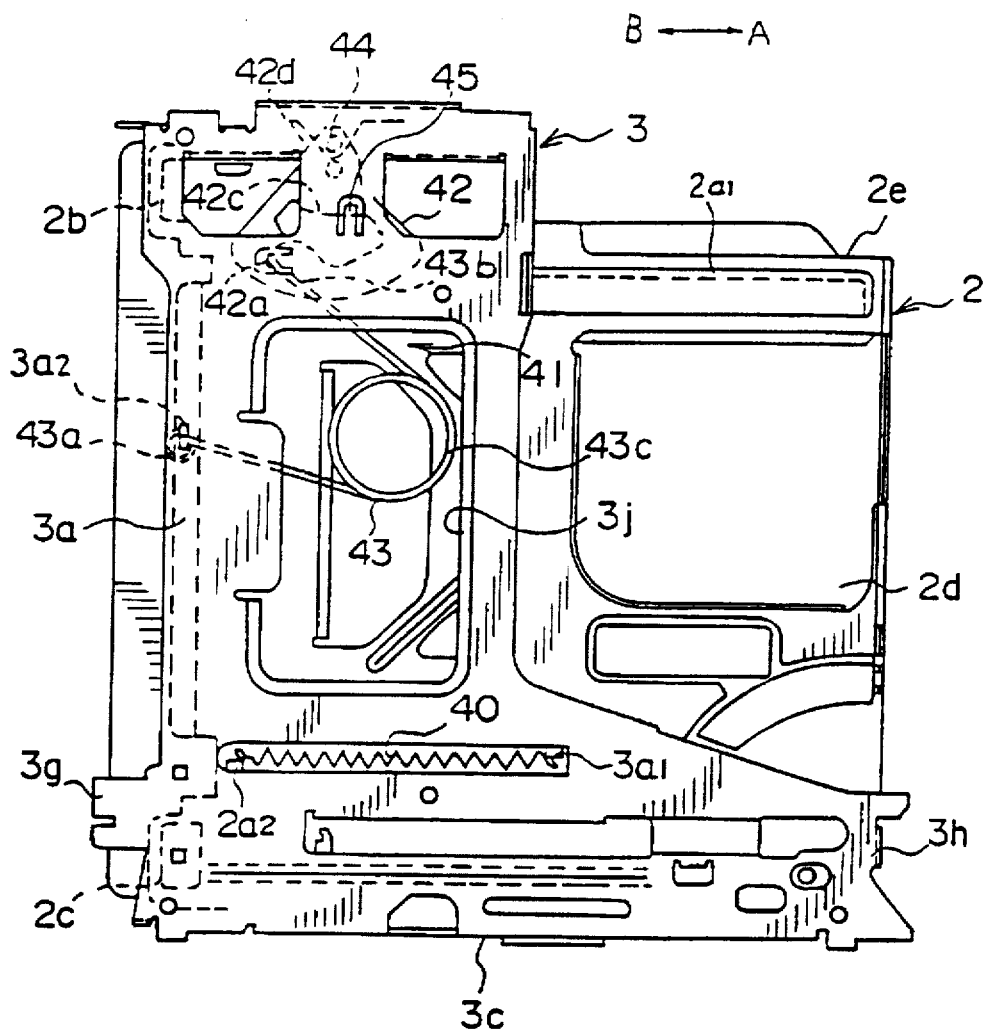
FIG. 6 shows a plan view illustrating an arrangement, in the disk apparatus shown in FIG. 1, in which the holder and slider are located in a disc cartridge loaded state.
Figure 7:
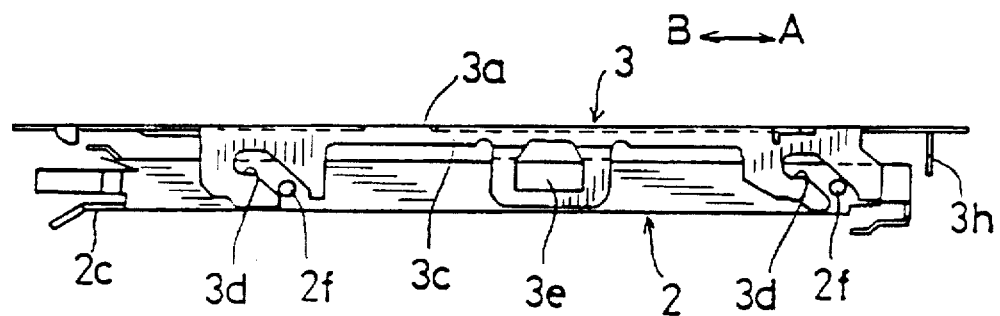
FIG. 7 shows a side elevation view illustrating the arrangement, in the disk apparatus shown in FIG. 1, in which the holder and slider are located in the disc cartridge loaded state.

FIGS. 4 and 5 show the plan and side elevation views of the holder 2 and slider 3 in the disk cartridge insertion/ejection state. FIGS. 6 and 7 show the plan and side elevation views of the holder 2 and slider 3 in the disk cartridge loaded state.

As shown in FIGS. 4 and 5, the top plate $3a$ of the slider is placed on the top plate $2a$ of the holder 2 and the engaging pins $2f$ are positioned in the inclined grooves $3d$ of the slider 3. When the disk cartridge is inserted into the holder 2, the above-described latch lever 24 is rotated clockwise as a result of being pressed by the disk cartridge.

Thereby, the above-mentioned shutter of the disk cartridge is pressed by the shutter opening/closing portion $24b$ of the latch lever 24. Further, the holding portion $3h$ of the slider 3 is released from the latch lever 24.

Further, between the top plate $2a$ of the holder 2 and the top plate $3a$ of the slider 3, a coil spring 40 is provided so as to apply a force along the A and B directions so as to cause the two plates $2a$ and $3a$ to be in proximity to each other. One end of the coil spring 40 is held with a holding portion $2a_2$ of the top plate $2a$ of the holder 2 and the other end of the spring 40 is held by a holding portion $3a_1$ of the top plate $3a$ of the slider 3. Because the possible movement of the holder 2 is merely rising and descending and the holder 2 cannot move along the A and B directions, the coil spring 40 pulls the slider 3 along the direction B.

When the slider 3 slides along the direction B as a result of being pulled by the coil spring 40 due to its elastic force, as shown in FIGS. 6 and 7, the engaging pins $2f$ of the holder 2 move downward along the inclined grooves $3d$ and thus the holder 2 moves downward to a loading position. Because the engaging holes $3e$ of the slider 3 engage with the projections $4b$ projecting at the two side surfaces of the chassis 4, the slider 4 is neither lifted nor lowered, and the possible movement of the slider 3 is merely sliding along the directions A and B. A damper mechanism 41 is provided between the top plate $2a$ of the holder 2 and the top plate $3a$ of the slider 3 and reduces the velocity in a sliding operation of the slider 3. The damper mechanism 41 is provided within a sliding range of the slider 3 and also is present in a gap formed between the holder 2 and slider 3. Accordingly, in comparison to the above-described related art in which the oil damper is provided outside the sliding range of the slider 3, a space for providing the oil damper is not needed and thus miniaturization of the disk apparatus 1 can be achieved.

The damper mechanism 41 includes the rotation member 42 which is rotatably provided on the top plate $3a$ of the slider 3 and the torsion spring 43 (a force applying member) which applies a force to the slider via the rotation member 42. The torsion spring 43 has two ends thereof bent to form rings so that the two ends of the torsion spring 43 can be easily held. One end of the torsion spring 43 is held by a holding portion $3a_2$ provided on the top plate $3a$ of the slider 3 and the other end of the torsion spring 43 is held by a holding portion $42a$ of the rotation member 42.

In this damper mechanism 41, as will be described later, with the slider's sliding operation, the rotation member 42 is rotated and thus a mutual spatial relationship between the holding portion $3a_2$ and the holding portion $42a$ of the rotation member 42 changes. Thereby, the torsion spring 43 applies a force to the slider 3 along the direction A opposite to a moving direction of the slider 3 at the beginning of a movement of the holder 2 from the disk cartridge insertion/ejection position to the loading position, so that the velocity of the slider's sliding operation is reduced, as will be described later. Then, when the rotation member 42 is rotated through a rotation angle larger than a predetermined angle as the slider 3 is sliding, the torsion spring 43 applies a force to the slider 3 along the direction B the same as the moving direction of the slider 3 and accelerates the sliding operation of the slider 3.

This acceleration of the slider 3 is such that, by the acceleration of the slider 3, the disk in the disk cartridge, driven by the slider 3, is positively chucked on the turntable 5 but the heads 6 and 7 do not substantially damage the disk. A specific mechanism, by which the disk is chucked on and thus is positively held by the turntable is well-known in a technical field of a flexible magnetic disk drive device.

A coil portion $43c$ of the torsion spring 43 is formed so as to be located in an opening $3j$ provided in the top plate $3a$ of the slider 3 and does not hinder the slider's sliding operation.

When the ejection button 26 is pressed by an operator after the disk cartridge has been loaded in the disk apparatus as a result of a descending operation of the holder 2, the slider slides in the direction A. Thereby, the holder 2 rises to the disk cartridge insertion/ejection position shown in FIGS. 4 and 5. Then, the latch lever 24 is released from rotating by the holding portion 3h of the slider 3 and the latch lever 24 rotates counterclockwise. As a result, the disk cartridge in the holder 2 is pressed by the shutter opening/closing portion 24b of the latch lever 24 and is ejected from the holder 2.

Figure 8:
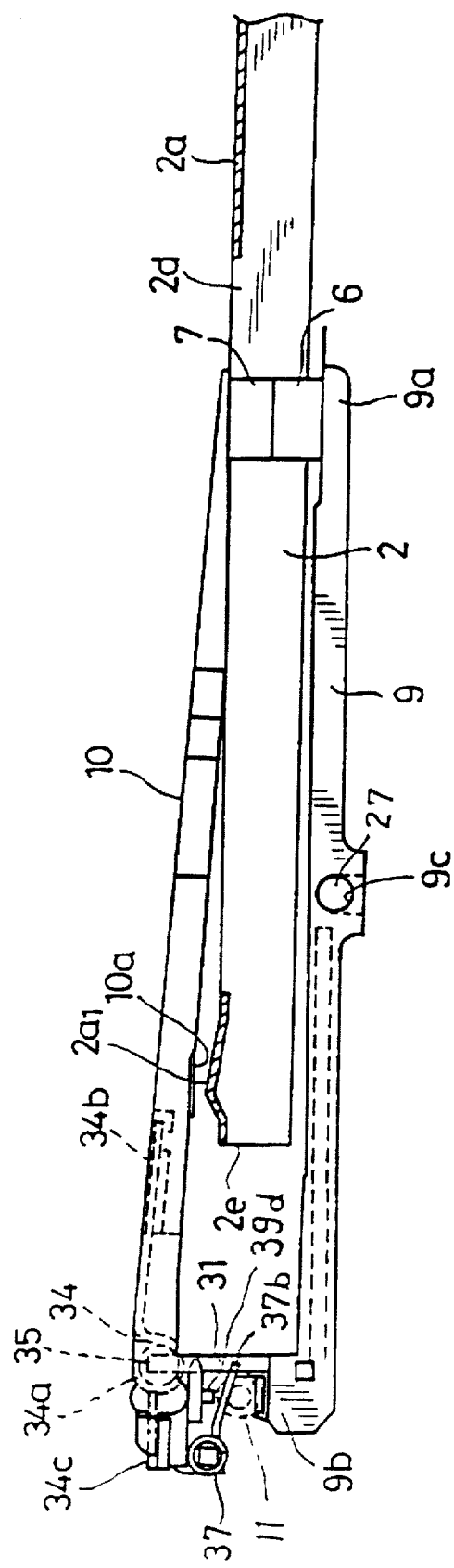
FIG. 8 shows a side elevation view of a head carriage in the disk apparatus shown in FIG. 1.
Figure 9:
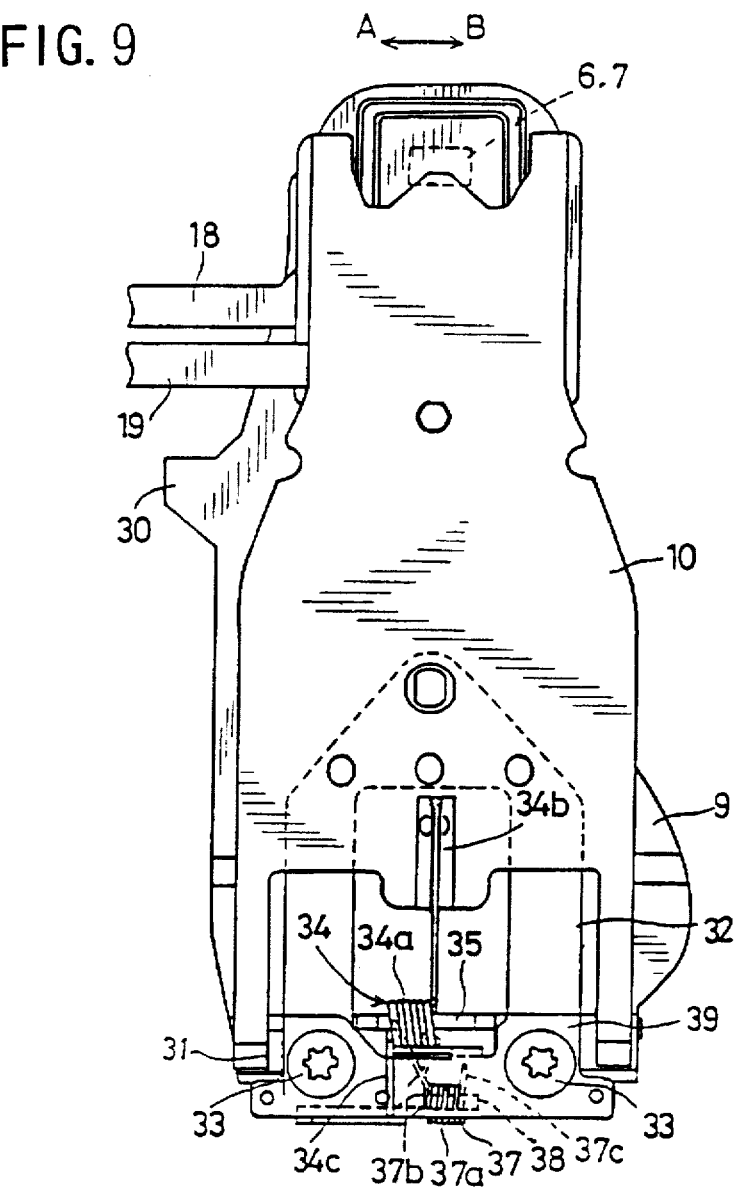
FIG. 9 shows a plan view of the head carriage in the disk apparatus shown in FIG. 1.
Figure 10:
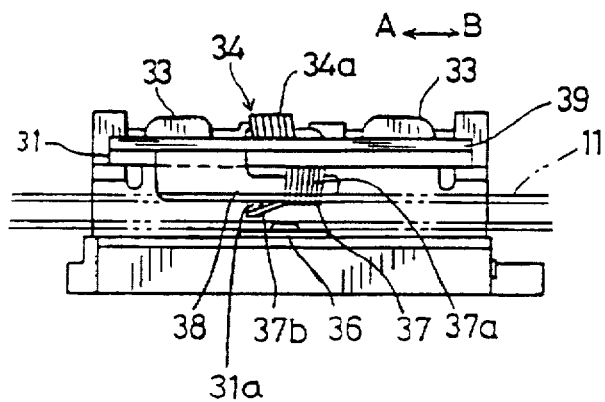
FIG. 10 shows a rear elevation view of the head carriage in the disk apparatus shown in FIG. 1.
Figure 11:
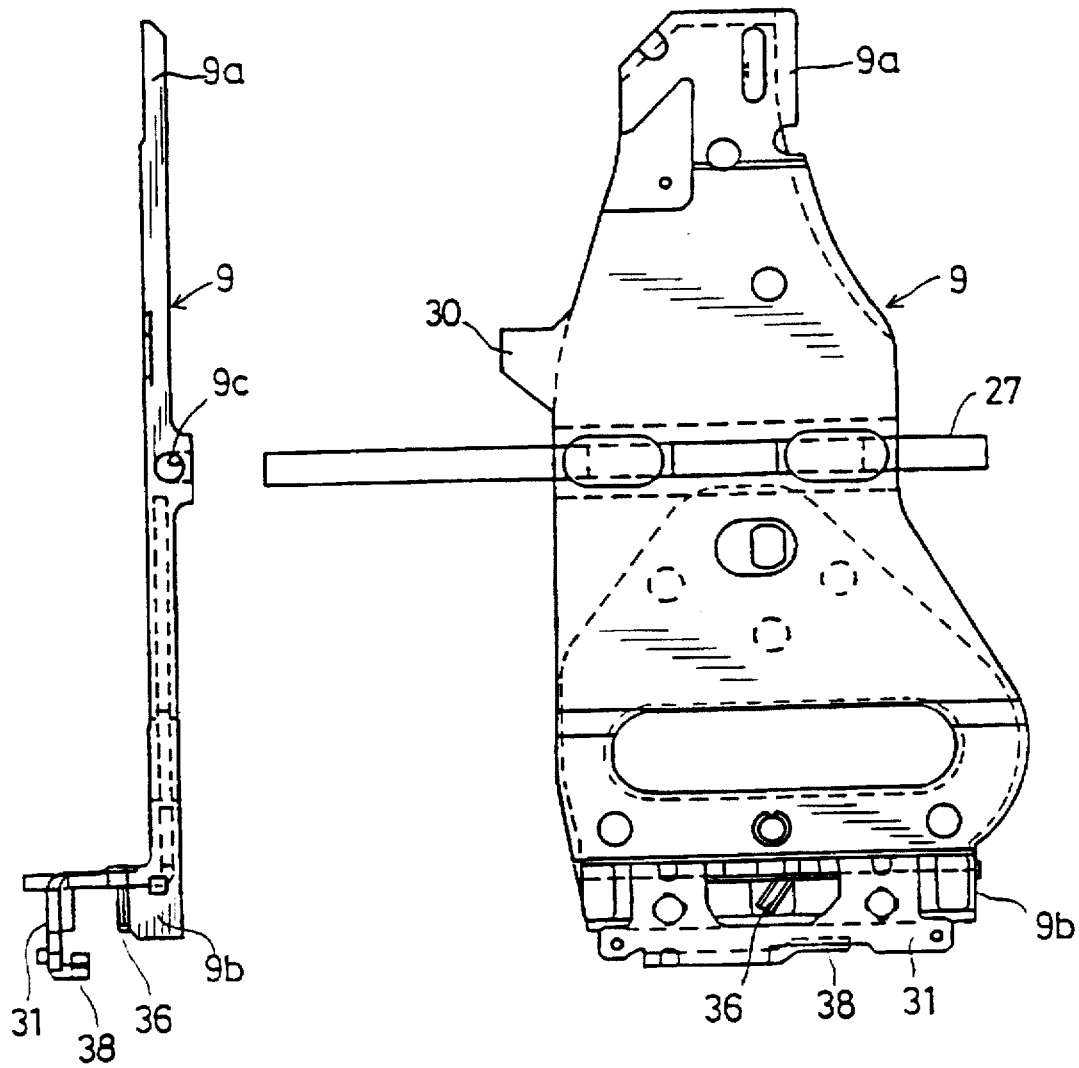
FIGS. 11A, 11B and 11C show a structure of a carriage body in the disk apparatus shown in FIG. 1.

The head carriage 8 will now be described with reference to FIGS. 8 through 11. FIG. 8 shows a side elevation view of the head carriage 8, FIG. 9 shows a plan view of the head carriage 8 and FIG. 10 shows a rear elevation view of the head carriage 8. Further, FIGS. 11A, 11B and 11C show the carriage body 9.

The head carriage 8 has a carriage body 9 which is integrally molded of a synthetic resin and a metal plate, and a head arm 10 which is rotatably provided on the carriage body 9 and can be raised and lowered. As shown in FIGS. 11A, 11B and 11C, the carriage body 9 is provided with a gimbal plate 9a, at the projecting end thereof, on which the magnetic head 6 is supported, and with a lead screw supporting portion 9b, at a projecting origin thereof, which engages with the lead screw 11.

The carriage body 9 is provided with a through hole 9c at a mid-position in the carriage body 9 and a guide shaft 27 passes through the through hole 9c. This engagement between the guide shaft 27 and the through hole 9c guides a sliding movement of the carriage body 9 along the directions A and B shown in FIGS. 11A and 11C when the magnetic heads 6 and 7 move, as the carriage body 9 slides on the guide shaft 27.

A detection piece 30 shown in FIG. 11A is used for a track position detection and projects along the direction A from a side wall of the carriage body 9. This projection direction is in parallel to a plane along which the above-mentioned substrate 16 extends. The detection piece 30 reaches a position at which the above-mentioned track position detecting sensor 17 is mounted, when the magnetic heads 6 and 7 reach and slide on the outermost track '00' of the magnetic disk. Thereby, the track position detecting sensor 17 outputs the outermost track '00' detection signal.

As shown in FIGS. 11A, 11B and 11C, a supporting portion 31 projects from the carriage body 9 at a position higher than a position of the lead screw supporting portion 9b as shown in FIG. 11C.

One end of a leaf spring 32 is fixed on the supporting portion 31 through screws 33 and the other end of the spring 32 is coupled to a bottom surface of the head arm 10. The head arm 10 can rotate, so that the magnetic head 7 provided at the projecting end thereof may rise and fall, due to bending of the leaf spring 32. Further, a torsion spring supporting portion 35 is provided at a top portion of the supporting portion 31. As shown in FIG. 9, the supporting portion 35 is inserted into the coil portion 34a of a torsion spring 34 and thus supports the torsion spring 34.

One end 34b of the torsion spring 34 presses a top surface of the head arm 10 downward and the other end 34c of the torsion spring 34 is held on the supporting portion 31. Thereby, the head arm 10 is pressed downward by the torsion spring 34 and lowers the upper magnetic head 7. This pressing force by the torsion spring 34 forms a head pressure applied to the surfaces of the magnetic disk by the magnetic heads 6 and 7.

An engaging projection 36 shown in FIGS. 11A and 11C engages with a screw groove of the lead screw 11 from the bottom side of the lead screw 11 and is provided on a top surface of the lead screw supporting portion 9b. This engaging projection 36 is integrally molded with the synthetic-resin made carriage body 9 and inclined along an angle corresponding to an inclined angle of the screw groove of the lead screw 11.

When the lead screw 11 is driven by the stepper motor 13 and is rotated, the engaging projection 36 moves in the directions A and B a distance corresponding to a rotation angle of the lead screw 11. As long as the engaging projection 36 engages with the lead screw 11, the head carriage 8 moves in the directions A and B a distance in proportion to a rotation amount of the lead screw 11.

A torsion spring 37 shown in FIG. 10 presses the lead screw 11 toward the engaging projection 36 and is supported in a state in which a coil portion 37a of the torsion spring 37 is fitted on a spring supporting portion 38 projecting at a rear portion of the supporting portion 31 as shown in FIG. 9. One end 37b of the torsion spring 37 extends so as to cross a top side of the lead screw 11 and the projecting edge of the end 37b is inserted into a holding hole 31a of the supporting portion 31.

The holding hole 31a is large as shown in FIG. 10 and thus the end 37b of the torsion spring 37 can move vertically. Thereby, the end 37b of the torsion spring 37 can move in response to movement of the lead screw 11 and positively press the lead screw 11 toward to the engaging projection 36. The other end 37c of the torsion spring 37c is held by the supporting portion 31.

When the disk cartridge is inserted into the holder 2, the damper mechanism 41 decelerate the velocity of the slider 3 in the sliding movement as discussed above. The damper mechanism 41 will now be described in detail with reference to FIGS. 12 through 14.

Figure 12:
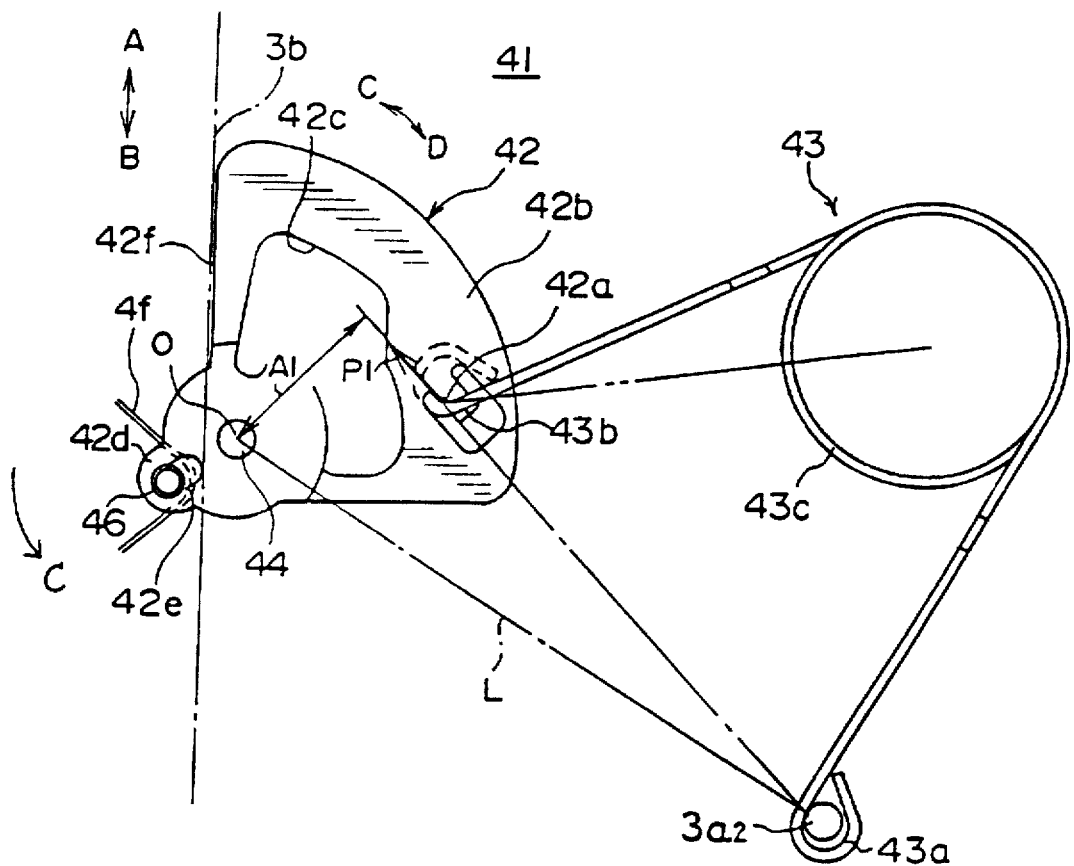
FIG. 12 shows a plan view of an arrangement of a rotation member and a torsion spring in the disk apparatus shown in FIG. 1 before a disk cartridge is inserted.
Figure 13:
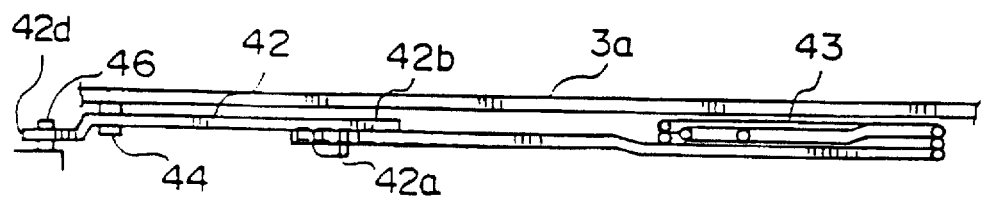
FIG. 13 shows a side elevation view of the arrangement of the rotation member and the torsion spring in the disk apparatus shown in FIG. 1 before the disk cartridge is inserted.
Figure 14:
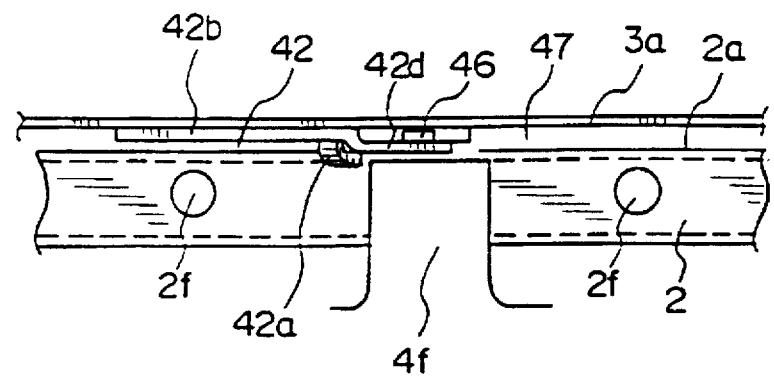
FIG. 14 shows a side elevation view of an arrangement of the rotation member in the disk apparatus shown in FIG. 1 before the disk cartridge is inserted.

FIG. 12 shows a plan view of an arrangement of the rotation member 42 and the torsion spring 43 in the disk apparatus 1 before the disk cartridge is inserted into the holder 2; FIG. 13 shows a side elevation view of the arrangement of the rotation member 42 and the torsion spring 43 before the disk cartridge is inserted into the holder 2; and FIG. 14 shows a side elevation view of the arrangement of the rotation member 42 before the disk cartridge is inserted. Actually, the holding portion $3a_2$ is formed as a result of being cut and bent. However, in each of FIGS. 12, 13 and 14, the holding portion $3a_2$ is indicated as a pin for the sake of simplification of description.

The rotation member 42 of the damper mechanism 41 is rotatably supported by a pin 44 which projects downwardly from the top plate 3a of the slider 3. The arc portion 42b has a holding portion 42a formed thereto as a result of being cut and bent and the holding portion 42a holds the end 43b of the torsion spring 43. An opening 42c is formed at a middle portion of the arc portion 42b and is engaged by a guide piece 45 which is formed on the top plate 3a as a result of being cut and bent.

A projection 42d extends in an opposite direction to the arc portion 42b and has a long hole 42e formed therein. A pin 46 formed on a supporting portion 4f of the chassis 4 is received in the long hole 42e. Therefore, as the slider 3 slides in the directions A and B, a mutual spatial relationship between the pin 46 fixed to the chassis 4 and the pin 44 of the slider 3 changes.

Thereby, the rotation member 42 can rotate. As the rotation member 42 rotates, a mutual spatial relationship between the holding portion $3a_2$ of the slider 3 to which the end 43a of the torsion spring 43 is held and the holding portion 42a of the rotation member 42 to which the other end 43b of the torsion spring 43 is held changes. Thereby, there is a change in the direction along which an elastic force of the torsion spring 43 is applied.

In order to insert the torsion spring 43 in a gap 47 between the holder 2 and slider 3, as shown in FIG. 13, the projection 42d and the holding portion 42a are bent downwardly.

Before the disk cartridge is inserted into the holder 2, as shown in FIG. 12, with respect to a reference line L connecting between the end 43a of the torsion spring 43 and the rotation central axis O of the rotation member 42, a position at which the other end 43b of the torsion spring 43 is held is positioned in the direction A opposite to the direction B in which the slider 3 slides when the disk cartridge is inserted into the holder 2.

A pressing force P1 of the torsion spring 43 causes the rotation member 42 to rotate in a direction C shown in FIG. 12. Then, a side portion 42f of the arc portion 42b of the rotation member 42 stops its movement immediately before coming into contact with a side portion 3b of the slider 3.

In this state, the pressing force P1 of the torsion spring 43 is applied in a direction different by a distance A1 from the central rotational axis O of the rotation member 42. As a result, the torsion spring 43 presses the holding portion 42a of the rotation member 42 in the direction C. The rotation member 42 presses the pin 46, in the direction C. As a result, a force is applied to the pin 44, which supports the rotation member 42, in the direction A due to a resulting reaction force by the pin 46.

Due to the reaction force by the pin 46 via the rotation member 42 and then the pin 44 of the slider 3, a force is applied to the slider 3 in the direction A opposite to the direction B in which the slider 3 slides when the disk cartridge is inserted into the holder 2. Thereby, at the beginning of an operation of inserting the disk cartridge into the holder 2, the slider 2 is pressed in the direction A by the torsion spring 43 and the velocity of the slider 3 in the sliding operation is effectively decelerated.

After an operator inserts the disk cartridge in the holder 2 and thus the slider 3 slides a predetermined distance as the velocity of the slider 3 is being decelerated as described above, the mutual spatial relationship between the pin 46 fixed to the chassis 4 and the pin 44 of the slider 2 changes accordingly. As a result, the rotation member 42 is rotated in the direction D. Due to the rotation of the rotation member 42, the two ends 43a and 43b of the torsion spring 43 are held and the pin 44 (acting as the rotational central axis O of the rotation member 42) are aligned on the above-mentioned reference line L with one another momentarily as shown in FIG. 15.

In this state, the pressing force P2 of the torsion spring 43 is applied in a direction toward the rotational central axis O of the rotation member 42. As a result, forces applied to the rotation member 42 are balanced with one another. Therefore, as the rotation member 42 is rotated in the direction D, the pressing force along the direction A is reduced until the balanced state shown in FIG. 15 is reached.

Figure 15:
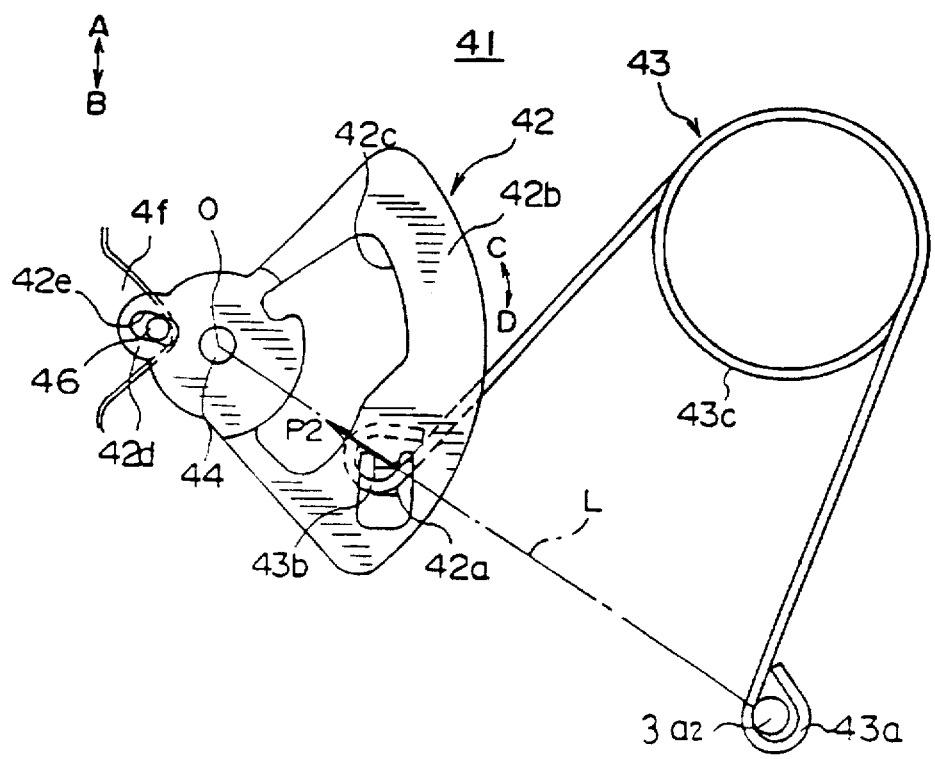
FIG. 15 shows a plan view of an arrangement, in the disk apparatus shown in FIG. 1, in which two ends of the torsion spring and a rotation central axis of the rotation member are aligned with one another.

Then, the operation of inserting the disk cartridge into the holder is continued after the balanced state shown in FIG. 15 has been reached. As a result, as shown in FIG. 16, the position at which the end 43b of the torsion spring 43 is held is positioned in the direction B with respect to the above-mentioned reference line L.

In this state, because the pressing force P3 of the torsion spring 43 is applied along a direction different by a distance A3 from the rotational central axis O of the rotation member 42, the pressing force P3 of the torsion spring 43 causes the rotation member 42 to rotate in the direction D. Then, the rotation of the rotation member 42 is stopped as the holder 2 descends to the loading position and sliding movement of the slider 2 is stopped.

Figure 16:
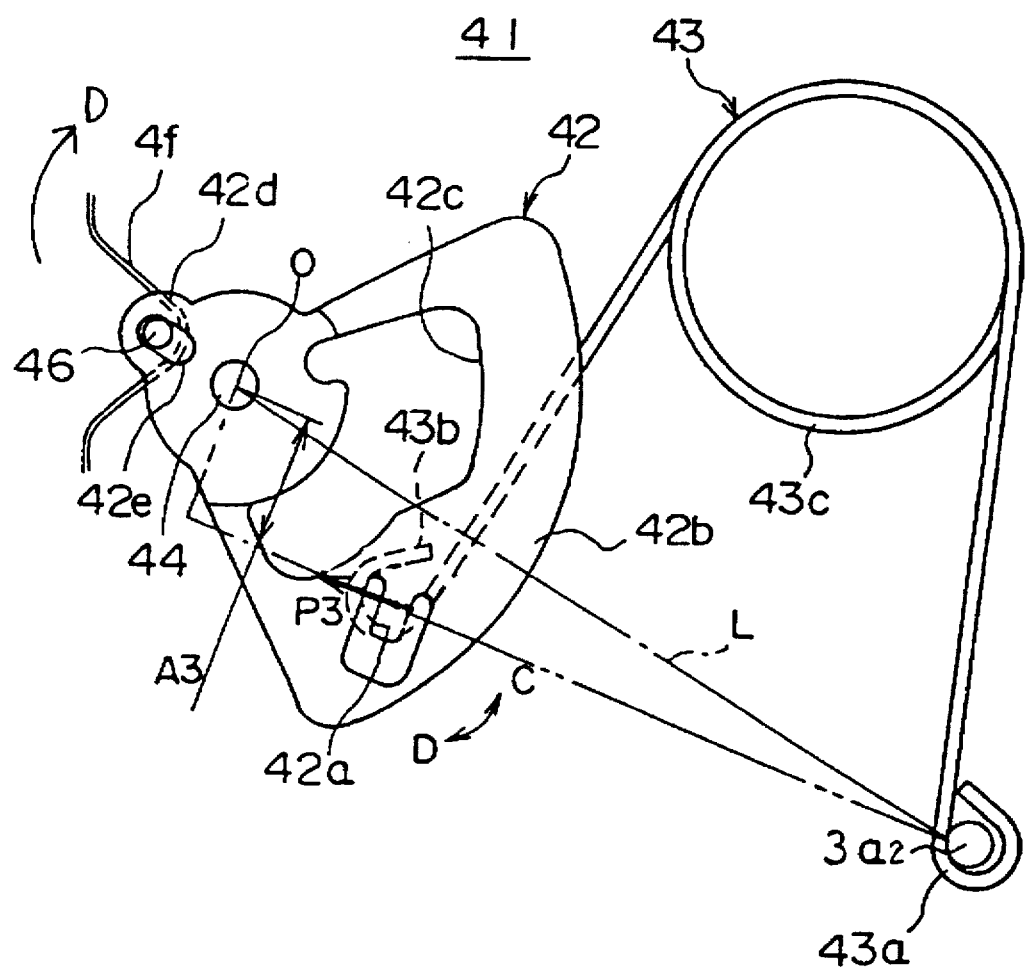
FIG. 16 shows a plan view of an arrangement, in the disk apparatus shown in FIG. 1, illustrating an operation of a damper mechanism when the disk cartridge is inserted.

In the state shown in FIG. 16, because the rotation member 42 presses the pin 46 in the direction D, the pin 44 supporting the rotation member 42 is pressed in the direction B due to a reaction force by the pin 46.

Due to the reaction force by the pin 46 and the rotation member 42, the slider 3 is pressed along the direction B in which the slider 3 is sliding as the disk cartridge is being inserted into the holder 2. As a result, immediately before the sliding operation of the slider 2 is finished and the disk cartridge is loaded in the holder 2, the slider 3 is pressed in the direction B and the velocity of the sliding operation is accelerated.

The holder 2 is positively lowered by the sliding movement of the slider 3 to the loading position and the magnetic disk contained in the disk cartridge loaded in the holder 2 is positively loaded on the turntable 5.

Figure 17:
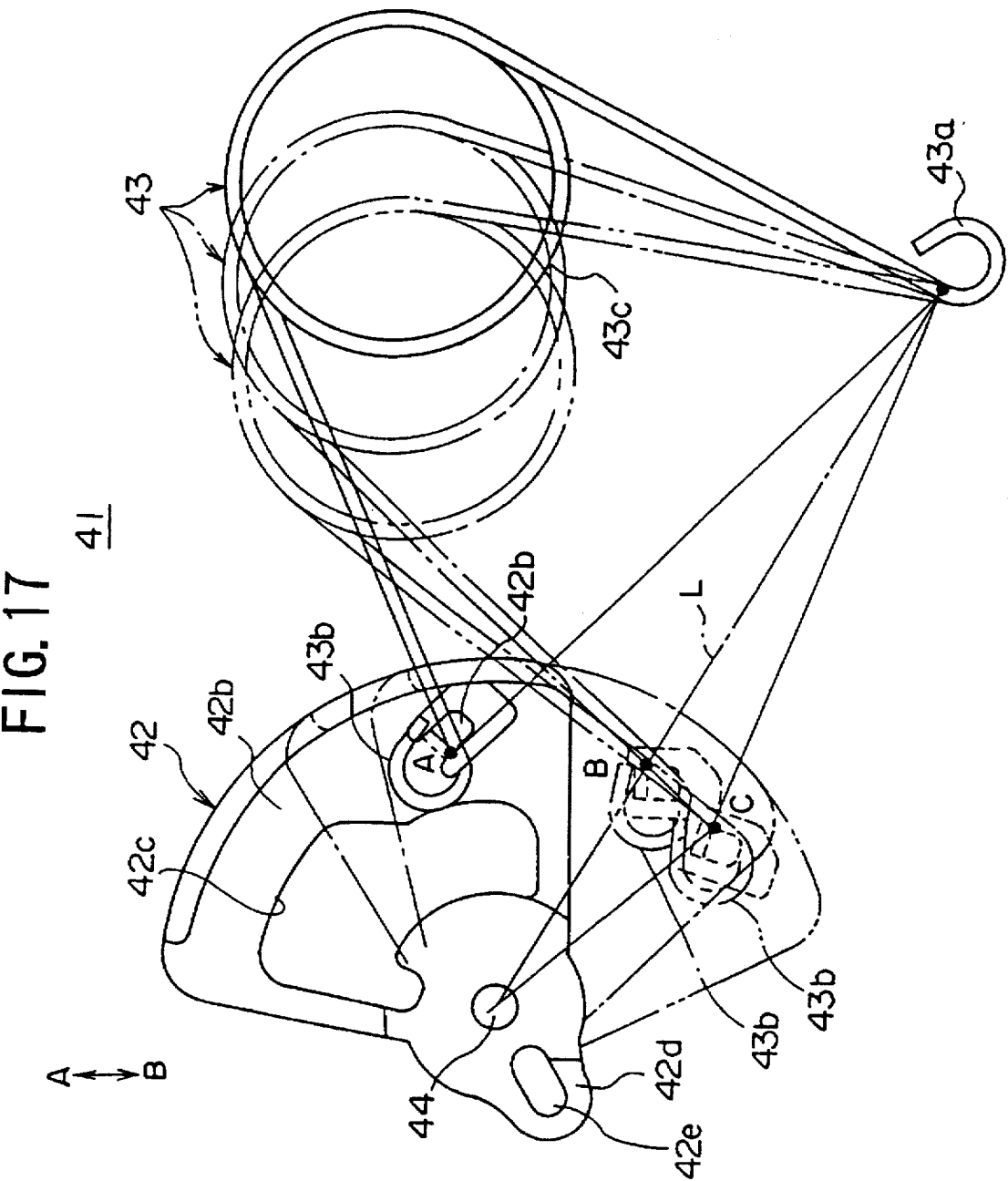
FIG. 17 shows a plan view of an arrangement, in the disk apparatus shown in FIG. 1, illustrating a sequential arrangement transition of the rotation member and torsion spring.

FIG. 17 illustrates the above-described sequential transition of the rotation member 42 and torsion spring 43.

In FIG. 17, for the sake of simplification of description, it is indicated that the rotation member 42 rotates about the pin 44 and the torsion spring 43 rotates about the end 43a. However, actually, as the slider is sliding, the pin 44 and the end 43a of the torsion spring 43 also move. The position at which the end 43b of the torsion spring 43 is held by the holding portion 43a of the rotation member 42 moves from a point A, to a point B and then to a point C as the disk cartridge is being inserted into the holder 2.

As described above, the reaction force resulting from the application of the elastic force by the torsion spring 43 causes the velocity of the slider 3 in the sliding operation to be reduced during a time period. This time period starts before the disk cartridge is inserted into the holder 2 and thus the above-mentioned position is located at the point A. Then, this time period ends when the disk cartridge is inserted into the holder 2 and the above-mentioned position is located at the point B. This state is the balanced state shown in FIG. 15. Then, the reaction force resulting from the application of the elastic force by the torsion spring 43 causes the velocity of the slider 3 in the sliding operation to increase during a time period. This time period starts after the balance stated is passed at which the above-mentioned position is located at the point C. Then, the time period ends when the disk cartridge is loaded in the holder 2 and the above-mentioned position is located at the point C.

Further, as shown in FIG. 17, a distance between the points A and B of the position at which the end 43b of the torsion spring 43 is held is longer than a distance between the points B and C of the position at which the end 43b of the torsion spring 43 is held. Further, the torsion spring 43 can continuously change from deceleration to acceleration of the sliding operation of the slider 3 sliding in the direction B as a result of the disk cartridge being inserted into the holder 2.

Figure 18:
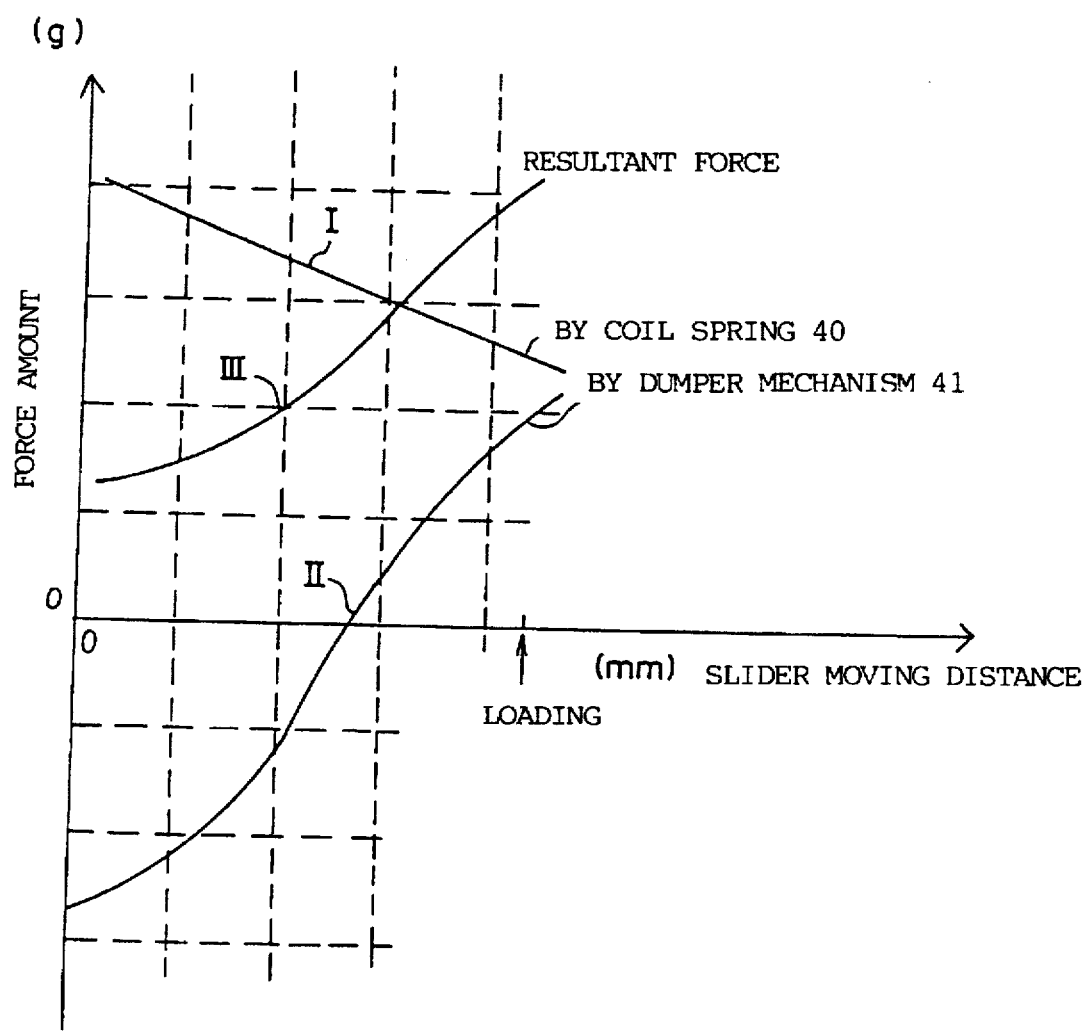
FIG. 18 shows a graph illustrating change of a force applied with respect to a distance which the slider slides.

FIG. 18 shows how a force applied to the slider 3 changes as the sliding distance of the slider changes. A curve I shown in FIG. 18 indicates an amount of the elastic force of the coil spring 40 shown in FIG. 4 applied to the slider 3. A curve II indicates an amount of the elastic force (the reaction force by the pin 46 of the chassis) of the coil spring 43 of the damper mechanism 41 applied to the slider 3. A curve III indicates an amount of a resultant force of the elastic force indicated by the curve I and the elastic force (the reaction force by the pin 46 of the chassis) of the damper mechanism 41 indicated by the curve II.

The curves shown in FIG. 18 indicate the changes of the forces as the sliding distance of the slider 3 changes. The coil spring 40 continues to apply the elastic force to the slider 3 in the direction B. However, at the beginning of the disk cartridge insertion operation, because the force in the direction A applied by the damper mechanism 41 is relatively large, the resultant force in the direction B applied to the slider 3 is reduced. Then, in a process the slider 3 is sliding in the direction B, as the force in the direction A applied by the damper mechanism 41 decreases, the resultant force in the direction B applied to the slider 3 increases.

Accordingly, the damper mechanism 41 not only effectively decelerates the slider 3 in the sliding operation when the disk cartridge is inserted, but also effectively increases a driving force immediately before the disk cartridge, inserted in the holder 2, is loaded in the disk apparatus 1 and thus the magnetic disk in the disk cartridge can be positively loaded on the turntable 5.

Further, when the thus-loaded disk cartridge is ejected from the holder 2 and from the disk apparatus 1, an operation in reverse to the above-described loading operation is performed. Therefore, as an operator is pressing the ejection button 26, the operating force required for pressing the ejection button 27 is being reduced. Thereby, in the disk cartridge ejecting operation, the operation force to be applied to the ejection button 27 decreases and the disk cartridge can be positively ejected.

In the disk cartridge ejecting operation, the slider 3 can be pressed in a direction opposite to the direction in which the coil spring 40 applies the elastic force to the slider 3. Thereby, the load borne by the latch lever 24 which holds the slider 3 can be reduced. As a result, it is possible to reduce the friction force applied between the slider 3 and the latch lever 24 and, as a result, it is possible to reduce the force to be applied to the disk cartridge by an operator when the disk cartridge is inserted into the holder 2.

Although the above-described embodiment is the magnetic disk apparatus, the present invention can also be applied to other types of disk apparatuses such as an optical disc apparatus, a magneto-optical disc apparatus and so forth.

Further, the shape of the rotation member 42 can be replaced by another shape and also a compression coil spring can be used instead of the torsion spring 43.

Although the slider 3 slides on the holder 2 in the above-described embodiment, it is also possible to apply the present invention to a disk apparatus in which a slider slides between a top plate of a chassis and a holder. In this case, the rotation member 42 and the torsion spring 43 are located between the slider and chassis.

As described above, according to the present invention, the rotation member (42) and force applying member (torsion spring 43) are provided within a sliding range of the sliding member (slider 3). Thereby, it is not necessary to prepare a space for providing these members outside the sliding range of the sliding member. As a result, miniaturization of the disk apparatus can be achieved. Further, the damper mechanism can be embodied simply using the rotation member and force applying member. It is possible to reduce costs required for manufacturing the disk apparatus. Further, the sliding movement can be accelerated immediately before the disk cartridge is loaded and the magnetic disk contained in the disk cartridge inserted in the holder 2 can be positively loaded on the turntable. When the disk cartridge is ejected, the operation force decreases as the ejection button is pressed and the ejection operation can be positively achieved. In the ejecting operation, a force is applied to the sliding member in a direction opposite to a direction in which the elastic force of the other spring, which causes the sliding member to slide, is applied. As a result, a load borne by the latch lever which holds the sliding member can be reduced. Thus, a friction force to be applied between the sliding member and the latch lever can be reduced and an insertion force required for inserting the disk cartridge into the holder can be reduced.

In the above-described embodiment, as shown in FIG. 12, the rotation member 42 is rotatably supported by the pin 4 of the slider 3 and the pin 46 of the chassis 4. Further, the first end of the torsion spring 43 is connected with the rotation member 42 and the second end of the torsion spring 43 is connected with the slider 3. However, an application of the present invention is not limited to this arrangement shown in FIG. 12. It is also possible to apply the present invention to any two members of a holder, a slider and a chassis, for example, such as those used in the above-described embodiment. An arm acting as the rotation member 42 is rotatably connected with each of these two members. A first end of a torsion spring such as the torsion spring 43 is rotatably connected with a predetermined portion of the arm and a second end of the torsion spring is rotatably connected with one of the these two member. In this arrangement, the arm and torsion spring act in a manner similar to a manner in which the rotation member 42 and the torsion spring 43 in the above-described embodiment act. Therefore, similar advantages can be obtained.

Further, as a variant of the above-described arrangement as another application of the present invention, it is also possible that use of the arm is eliminated and the two ends of the torsion spring are directly rotatably connected with these two members, respectively. Also in this arrangement, as spatial relationship between the two members changes, the torsion spring is rotated accordingly. As a result, a direction of a force to press the two members due to the expanding force of the torsion spring changes. Thus, in this case, solely the torsion spring performs a function similar to a function performed by both the rotation member 42 and torsion spring 43 in the above-described embodiment. Therefore, similar advantages can be obtained.

Further, the present invention is not limited to the above-described embodiments, and variations and modifications may be made without departing from the scope of the present invention.

What is claimed is:

1. A disk apparatus comprising:

a holder to receive and hold a disk cartridge;

a sliding member which slides in response to a disk cartridge being inserted into said holder;

said holder being moved in response to the sliding of said sliding member, said holder moving from a disk cartridge insertion/ejection position to a disk cartridge loading position;

a rotation member rotatably provided within the sliding range of said sliding member said rotation member being rotated responsive to the sliding movement of said sliding member;

a force applying member provided within said sliding range of said sliding member, one end of said force applying member being connected with said sliding member and the other end of said force applying member being connected with said rotation member; and wherein said force applying member and said rotation member are configured so that;

initially a force is applied to said sliding member substantially in a direction opposite to the direction in which said sliding member is sliding, said force being applied during the first portion of the sliding movement of said sliding member to move said holder from said disk cartridge insertion/ejection position to said loading position; and subsequently a force is applied to said sliding member substantially in said direction in which said sliding member is sliding after said rotation member rotates a predetermined angle during the last portion of sliding movement of said sliding member to move said holder from said disk cartridge insertion/ejection position to said loading position.

2. The disk apparatus according to claim 1, wherein:

said disk cartridge includes an information recording disk; and said disk apparatus further comprises:

a turntable on which said information recording disk is loaded and rotated; and information recording/reproducing heads slidable on said information recording disk to record and reproduce data from said information recording disk;

and wherein:

upon insertion of the disk cartridge into said holder, said sliding member slides in a backward direction;

said holder in response to the backward sliding movement of said sliding member, being lowered and said information recording disk contained in said disk cartridge is lowered and loaded on said turntable.

3. The disk apparatus according to claim 2, wherein said information recording disk comprises a flexible magnetic disk.

4. A disk apparatus comprising:

a holder to receive and hold a disk cartridge;

a sliding member which slides in response to a disk cartridge being inserted into said holder;

said holder being moved in response to the sliding of said sliding member, said holder moving from a disk cartridge insertion/ejection position to a disk cartridge loading position;

a rotation member rotatably provided within the sliding range of said sliding member, said rotation member rotated responsive to the sliding movement of said sliding member;

a force applying member provided within said sliding range of said sliding member, one end of said force applying member being connected with said sliding member and the other end of said force applying member being connected with said rotation member; and, wherein said force applying member and said rotation member are configured so that:

a force is applied to said sliding member to push said sliding member substantially in a direction opposite to a direction in which said sliding member is sliding at a beginning of a process in which said sliding member is sliding to move said holder from said disk cartridge insertion/ejection position to said loading position; and another force is applied to said sliding member to push said sliding member substantially in said direction in which said sliding member is sliding after said rotation member rotates a predetermined angle in said process in which said sliding member is sliding to move said holder from said disk cartridge insertion/ejection position to said loading position; and wherein, said force applying member comprises a spring, one end of said spring being connected with said sliding member, said spring being in a compressed state so that an elastic force is applied to ends of said spring;

said rotation member is rotatably supported on said sliding member, one end of said rotation member being connected with the other end of said spring and the other end of said rotation member being connected with a chassis of said disk apparatus; and during the first portion of the sliding movement of said sliding member, said rotation member is at a rotational angle such that the elastic force of said spring against said rotation member causes a reaction force by said chassis to press said rotation member and said sliding member in a direction opposition to the direction said sliding member is sliding; and subsequent to said sliding member sliding a predetermined distance, said rotation member is an another rotational angle such that the elastic force of said spring pressing said rotation member causes the reaction force by said chassis to press said rotation member and said sliding member in the direction said sliding member is sliding.

5. A disk apparatus comprising:

a holder to receive and hold a disk cartridge;

a sliding member which slides in response to a disk cartridge being inserted into said holder;

said holder being moved in response to of said sliding member between a disk cartridge insertion/ejection position and a disk cartridge loading position in a predetermined process;

a rotation member provided to be rotatable about a frame, said rotation member being connected with said sliding member said rotation member being rotated responsive to the sliding movement of said slider;

a force applying member, a first end of said force applying member being connected with said sliding member and a second end of said force applying member being connected with said rotation member; and wherein said force applying member and said rotation member are configured so that:

initially a force is applied to said sliding member substantially in a direction opposite to a direction in which said sliding member is sliding in said predetermined process during the first portion of the sliding movement of said sliding member; and subsequently a force is applied to said sliding member substantially in the direction in which said sliding member is sliding in said predetermined process during the last portion of the sliding movement of said sliding member.

* * * * *